US011097605B2

(12) United States Patent
Mahler

(10) Patent No.: US 11,097,605 B2
(45) Date of Patent: Aug. 24, 2021

(54) AUTO LATCH FOR TONNEAU COVER SYSTEM

(71) Applicant: Extang Corporation, Ann Arbor, MI (US)

(72) Inventor: Eric Scott Mahler, White Lake, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 78 days.

(21) Appl. No.: 16/662,639

(22) Filed: Oct. 24, 2019

(65) Prior Publication Data
US 2021/0122219 A1    Apr. 29, 2021

(51) Int. Cl.
| *B60J 7/185* | (2006.01) |
| *B60J 7/14* | (2006.01) |
| *B62D 33/04* | (2006.01) |
| *B60J 7/19* | (2006.01) |

(52) U.S. Cl.
CPC ............. *B60J 7/141* (2013.01); *B60J 7/185* (2013.01); *B60J 7/19* (2013.01); *B62D 33/046* (2013.01)

(58) Field of Classification Search
CPC ....... B60J 7/08; B60J 7/106; B60J 7/14; B60J 7/141; B60J 7/16; B60J 7/1607; B60J 7/185; B60J 7/19
USPC ............. 296/100.01, 100.02, 100.06, 100.07
See application file for complete search history.

(56) References Cited

U.S. PATENT DOCUMENTS

| 7,188,888 | B2 |  | 3/2007 | Wheatley et al. |
| 7,334,830 | B2 |  | 2/2008 | Weldy |
| 7,452,024 | B2 |  | 11/2008 | Landrith et al. |
| 8,807,625 | B2 |  | 8/2014 | Garska |
| 9,067,481 | B2 | * | 6/2015 | Xu .......................... B60J 7/1607 |
| 9,290,122 | B2 |  | 3/2016 | Spencer |
| 9,827,839 | B2 | * | 11/2017 | Williamson ............. B60J 7/198 |
| 9,889,789 | B2 |  | 2/2018 | Beltowski et al. |
| 9,925,853 | B2 |  | 3/2018 | Aubrey et al. |
| 10,000,113 | B2 |  | 6/2018 | Schmeichel et al. |
| 10,286,765 | B2 | * | 5/2019 | Williamson ............. B60J 7/198 |
| 10,315,498 | B2 |  | 6/2019 | Parkey |
| 2016/0200375 | A1 | * | 7/2016 | Kerr, III ................... B60J 7/141 |
|  |  |  |  | 296/100.07 |
| 2017/0240033 | A1 |  | 8/2017 | Dylewski, II et al. |
| 2018/0297457 | A1 |  | 10/2018 | Spencer |
| 2019/0009657 | A1 | * | 1/2019 | Carter ...................... B60J 7/141 |

* cited by examiner

*Primary Examiner* — Jason S Daniels
(74) *Attorney, Agent, or Firm* — The Dobrusin Law Firm, P.C.; Bryan S. Lemanski

(57) ABSTRACT

A tonneau cover system, comprising: (a) one or more brackets secured to at least one of a pair of opposing sidewalls of a cargo box of a vehicle; (b) a foldable tonneau cover having a plurality of interconnected panels, at least one of the plurality of interconnected panels including: (1) one or more latch assemblies that engage the one or more brackets; and (2) an actuator assembly connected to each of the one or more latch assemblies by a cable, wherein actuation of the actuator assembly moves the cables that in turn release engagement of the one or more latch assemblies from the one or more brackets.

18 Claims, 8 Drawing Sheets

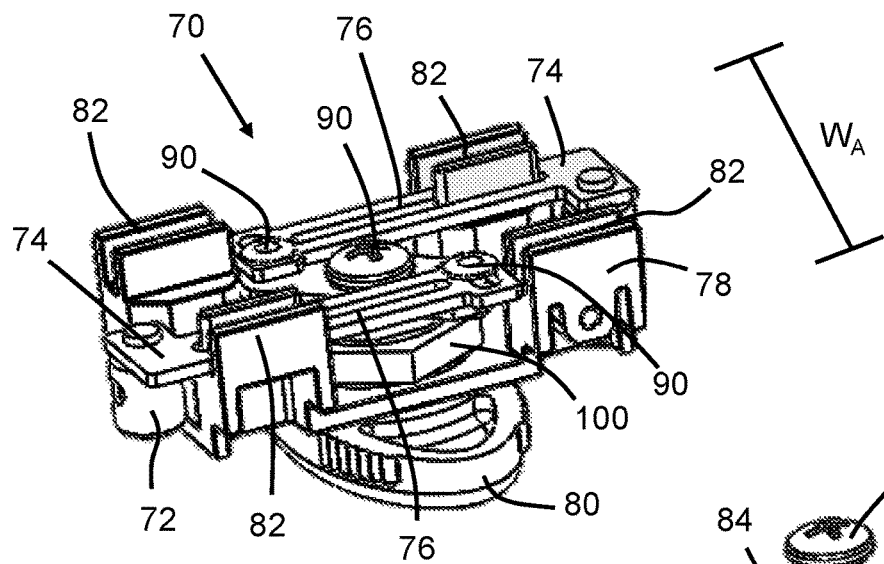
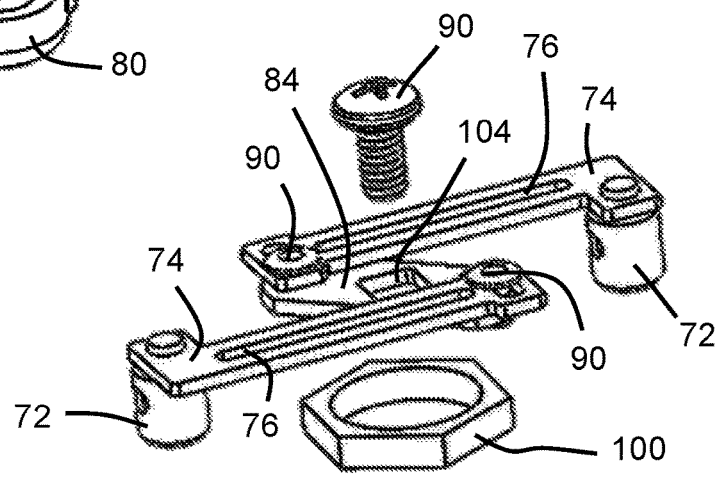
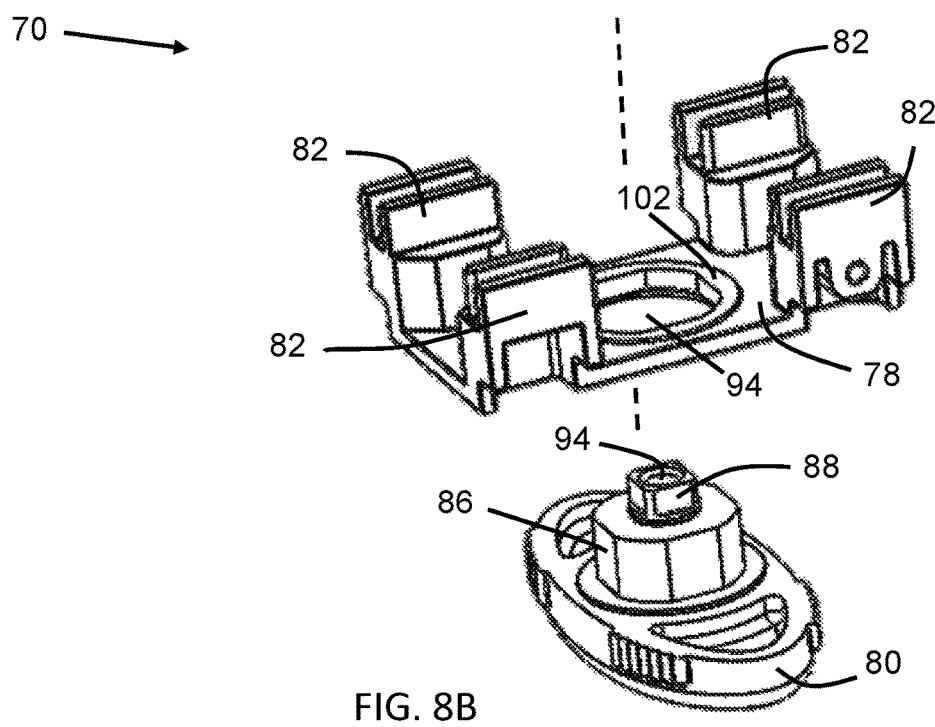
FIG. 8A
FIG. 8B

AUTO LATCH FOR TONNEAU COVER SYSTEM

FIELD

The present teachings generally relate to a tonneau cover system, and more specifically, to a foldable tonneau cover having one or more latch assemblies actuated by one or more actuator assemblies.

BACKGROUND

Tonneau cover systems are typically used to cover and/or protect a cargo bed or unoccupied portion of a vehicle from environmental degradation. Typical tonneau cover systems may include a plurality of panels that are attached to the vehicle to secure a tonneau cover to the vehicle. One or more of the panels of the cover system may include a structural member that is attached directly to a portion of the vehicle to secure the tonneau cover. The cover may then prevent moisture, debris, unwanted objects, or a combination thereof from entering the cargo bed or unoccupied portion and damaging cargo or the vehicle itself. The tonneau cover system may include a rigid frame design, such that when fully assembled and attached to the vehicle, the panels create a unitary structure. Alternatively, the tonneau cover system may include one or more hinge-points between the panels so that the tonneau cover may remain partially attached to the vehicle, yet be folded onto itself to uncover only a portion of the cargo bed or unoccupied portion.

Tonneau covers may be attached to a vehicle using a variety of mechanical fasteners, such as snap-fit clips, bolts, screws, hooks, mounting brackets, or a combination thereof. Frequently, to ensure a tightly secured connection between the tonneau cover and the vehicle, the tonneau cover system may use a plurality of latches to secure the panels (or structural members thereof) to one or more sidewalls of the cargo bed. Each latch may include a latching feature that latches directly to a portion of the sidewalls, one or more brackets attached to the sidewalls, or both.

Tonneau cover latches may frequently latch automatically to a portion of the sidewall of the cargo bed, one or more brackets secured to the sidewalls, or both. However, the latches may often require a user to manually release each latch individually. As the latches are frequently disposed along opposing sides of the tonneau cover to secure the tonneau cover to opposing sidewalls of a cargo bed, a user may be required to travel back and forth to opposing sides of the vehicle to unlatch even a single panel of the tonneau cover. When a user wants to open a plurality of panels, the user must repeat the aforementioned process for each panel, requiring extensive time and energy to access the cargo bed. Additionally, each latch may require manual release using extensive force and/or energy, thereby even further making the opening process of the tonneau cover burdensome.

Examples, of tonneau systems may be found in U.S. Pat. Nos. 7,188,888; 7,334,830; 7,452,024; 8,807,625; 9,290,122; 9,827,839; 9,889,789; 9,925,853; 10,000,113; and 10,315,498; and U.S. Patent Publication Nos. 2017/0240033; and 2018/0297457, all of which are incorporated herein for all purposes. It would be attractive to have a tonneau cover system that allows for easy access to all or a portion of a cargo bed of a vehicle. What is needed is a tonneau cover system having a tonneau cover with a plurality of releasable panels to access the cargo bed of a vehicle. It would be attractive to have a tonneau cover system with latches that may be quickly and easily released. What is needed is a tonneau cover system with latches that may be released by actuating an actuator connected to the latches. It would be attractive to have a tonneau cover system that may be released from a cargo bed of a vehicle without a user unlatching each cover latch of a tonneau cover individually. What is needed is a tonneau cover system having a common release mechanism for a plurality of latches.

SUMMARY

The present teachings meet one or more of the present needs by providing a tonneau cover system, comprising: (a) one or more brackets secured to at least one of a pair of opposing sidewalls of a cargo box of a vehicle; (b) a foldable tonneau cover having a plurality of interconnected panels, at least one of the plurality of interconnected panels including: (1) one or more latch assemblies that engage the one or more brackets; and (2) an actuator assembly connected to each of the one or more latch assemblies by a cable, wherein actuation of the actuator assembly moves the cables that in turn release engagement of the one or more latch assemblies from the one or more brackets.

The present teachings meet one or more of the present needs by providing a tonneau cover system, comprising: (a) a foldable tonneau cover having a plurality of interconnected panels, each of the panels including: (1) a crossmember having a pair of opposing flanges that form a channel; (2) a pair of latch assemblies secured in the channel and positioned near opposing terminal edges of the crossmember; and (3) an actuator assembly positioned within the channel between the pair of latch assemblies connected to each of the latch assemblies by a cable; and (b) a plurality of brackets secured to opposing sidewalls of a cargo box of a vehicle, a portion of each of the plurality of brackets configured to be received by a latch assembly to secure the tonneau cover to the cargo box, wherein the latch assemblies each include a latch bolt that locks a portion of the plurality of brackets to the latch assemblies, and wherein actuation of the actuator assembly of each panel simultaneously unlocks the pair of latch assemblies of that panel.

The present teachings meet one or more of the present needs by providing a tonneau cover system, wherein: the one or more latch assemblies, the actuator assembly, or both are secured within a crossmember of the panel; each panel is releasably secured to a pair of opposing brackets mounted to the pair of opposing sidewalls; each of the one or more latch assemblies includes: (a) a case having a receiving portion that receives an engaging portion of the one or more brackets; (b) a retainer positioned at least partially within the case and configured to support the engaging portion; and (c) a latch bolt slidably secured to the retainer and configured to at least partially enclose the receiving portion of the case to lock the engaging portion within the receiving portion, wherein the cable is connected to the latch bolt so that movement of the cable slides the latch bolt into the case to open the receiving portion and release the engaging portion; the latch bolt is in communication with a biasing member secured within the case and the latch bolt compresses the biasing member when moved by the cable so that, after tension of the cable is released, the latch bolt is moved by the biasing member back into a position that at least partially encloses the receiving portion; the actuator assembly includes: (a) a base; (b) one or more arms that each include a slot, wherein the one or more arms are movably connected to the base and guided along the slots by the base; and (c) a rotational member that articulates the one or more arms when rotated;

The present teachings meet one or more of the present needs by providing a tonneau cover system, wherein: each panel includes a first latch assembly positioned near a bracket on a first sidewall and a second latch assembly positioned near a bracket on a second opposing sidewall, and wherein the actuator assembly is positioned between the first latch assembly and the second latch assembly; the actuator assembly simultaneously releases engagement of the first latch assembly and the second latch assembly from their respective brackets; the crossmember of the panel includes a pair of opposing inwardly turned flanges, and the one or more latch assemblies, the actuator assembly, or both, are supported by the flanges; the latch bolt is connected to the cable so that, when the actuator assembly is actuated, the cable moves the latch bolt to unlock the latch assembly; a case of each latch assembly has a width greater than a width between the opposing flanges of the crossmember so that the latch assembly is supported by the opposing flanges; a base of the actuator assembly has a width greater than the width between the opposing flanges of the crossmember so that the actuator assembly is supported by the opposing flanges; the actuator assembly includes a first arm connected to the latch bolt of a first latch assembly by a first cable, and a second arm connected to the latch bolt of a second latch assembly by a second cable, so that, when the latch assemblies are articulated, tension is applied simultaneously to the first cable and the second cable to move the latch bolts and unlock the first latch assembly and the second latch assembly; each cable includes a head that is secured within a groove of the latch bolt; the first arm and the second arm are connected by a connecting portion, and rotation of a rotational member pivots the connecting portion to articulate the first arm and the second arm; a key of the rotational member is secured in a keyhole of the connecting portion to translate the rotation of the rotational member into pivoting the connecting portion; the pair of latch assemblies and the actuator assembly are fixedly secured to the crossmember; an engaging portion of each of the plurality of brackets is positioned within a receiving portion of each of the latch assemblies, and the latch bolt of each latch assembly encloses the receiving portion to lock the engaging portion in the receiving portion; the latch bolt slidably moves based on actuation of the actuator assembly to unlock the latch assembly and at least partially open the receiving portion to remove the engaging portion; or a combination thereof.

The present teachings meet one or more of the present needs by providing: a tonneau cover system that allows for easy access to all or a portion of a cargo bed of a vehicle; a tonneau cover system having a tonneau cover with a plurality of releasable panels to access the cargo bed of a vehicle; a tonneau cover system with latches that may be quickly and easily released; a tonneau cover system with latches that may be released by actuating an actuator connected to the latches; a tonneau cover system that may be released from a cargo bed of a vehicle without a user unlatching each cover latch of a tonneau cover individually; a tonneau cover system having a common release mechanism for a plurality of latches; or a combination thereof.

BRIEF DESCRIPTION OF THE DRAWINGS

FIG. 8A is a perspective view of an actuator assembly of a tonneau cover system.

FIG. 8B is an exploded view of the latch assembly of FIG. 8A.

DETAILED DESCRIPTION

Figure 1:
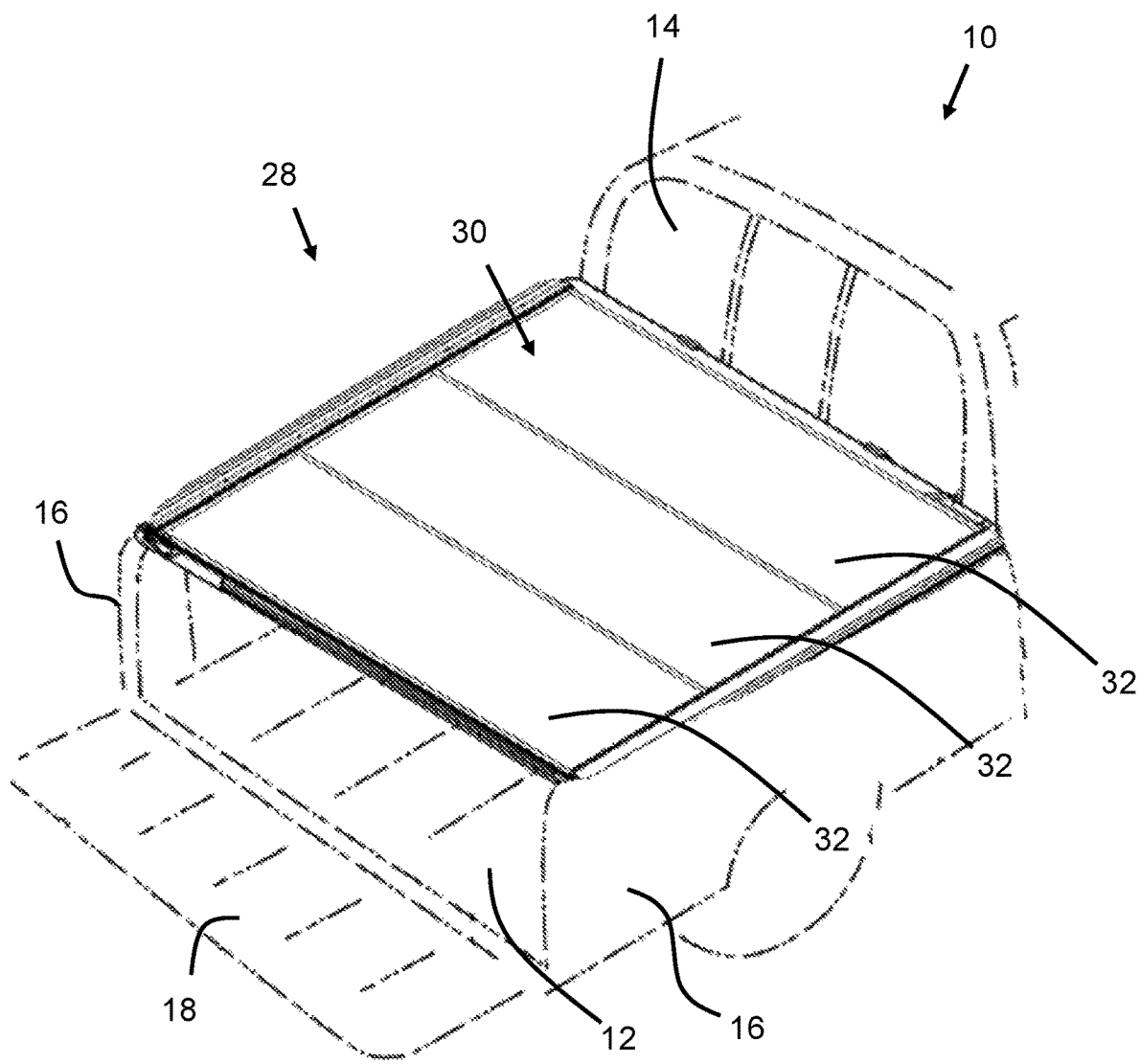
FIG. 1 is a perspective view of a tonneau cover system secured to a cargo box of a vehicle.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein generally relate to a tonneau cover system that may secure to a cargo bed or unoccupied portion of a vehicle (i.e., a portion of the vehicle adjacent to or outside of a passenger cabin)(hereinafter referred to as a "cargo box"). The tonneau cover system may attach to a cargo box of a pickup truck. The cargo box may consist of one or more sidewalls, one or more tailgates, or both. The one or more sidewalls, one or more tailgates, or both may include one or more mating surfaces. For example, the sidewalls may include a vertical lip substantially perpendicular to the ground and configured to mate with a surface of one or more mounting assemblies. The tonneau cover system may consist of a plurality of tonneau sections. The tonneau sections may be interlocked such that one or more of the tonneau sections are adapted to roll and/or fold onto one or more additional tonneau sections (i.e., a retractable tonneau system). For example, the tonneau sections may be connected by one or more dual linkage hinge assemblies so that the tonneau sections may fold and/or roll onto one another by pivoting the hinges of the dual linkage hinge assemblies. The tonneau sections may be connected using a plurality of side members, crossmembers, panels, retainers, or a combination thereof. Each tonneau section may include one or more side members, one or more crossmembers, or both. The one or more side members, one or more crossmembers, or both may connect to the cargo box using one or more mounting assemblies. For example, the tonneau sections may include a crossmember that spans between opposing retainers (e.g., brackets) that are secured to opposing sidewalls of a cargo box. The tonneau cover system may be unitary (i.e., a single connected piece), or may consist of a plurality of tonneau sections. The tonneau cover system may be structurally rigid. For example, the tonneau cover system may be sufficiently rigid to prevent an object, such as a heavy stone, from damaging the tonneau cover system and entering the cargo box. The tonneau cover system may be flexible such that the one or more sections of the tonneau cover system are movable while a portion of the tonneau cover system remains stationary. The tonneau cover system may be sufficiently flexible so that the tonneau cover system may be rolled onto itself. The tonneau cover system may comprise a uniform material or may comprise a plurality of materials. For example, the tonneau cover system may include metal side members and crossmembers yet have plastic panels secured to the side members and/or crossmembers. The tonneau cover system may include a tonneau cover.

The tonneau cover may function to prevent moisture, debris, or both from entering the cargo box or other compartment of a vehicle, such as a pickup truck. The tonneau cover may be configured to protect the cargo box or other compartment from environmental degradation. The environmental degradation may be corrosion, rust, mold/mildew, or a combination thereof, caused by precipitation and other environmental elements. The tonneau cover may be attached to the cargo box by one or more latches, one or more brackets, or both. The tonneau cover may be attached by fasteners, adhesives, or a combination thereof. The fasteners may be screws, bolts, nuts, nails, press-fit clips/buttons, hooks, latches, or a combination thereof. The adhesives may be glue, epoxy, polyurethane, cyanoacrylate, or a combination thereof. However, it is contemplated that the tonneau cover may be movably secured to the cargo box so that the tonneau cover may freely move to retract (i.e., open and expose a portion of the cargo box), close (i.e., cover the cargo box), or both. The tonneau cover may be flexible. The tonneau cover may be a continuous piece. For example, the tonneau cover may be a fabric that is rolled across a frame created by one or more side members, one or more crossmembers, or both, and attached to the frame in an unrolled state. The tonneau cover may be structurally rigid such that the cover deflects objects to prevent flexing, piercing, or both of the cover. The tonneau cover may be a fabric, metal, polymer, or a combination thereof. The tonneau cover may comprise a plurality of panels that make up the tonneau cover. For example, the cover may include a plurality of individual panels that, when installed, are connected (e.g., secured together) to form a unitary cover. The tonneau cover may include one or more seams. The tonneau cover may be free of seams. The tonneau cover may removably attach to the tonneau cover system such that the tonneau cover may be replaced without uninstalling the tonneau system.

The tonneau cover may include a plurality of panels. The panels may function to prevent moisture, debris, or both from entering the cargo box or other compartment of a vehicle. The panels may function to interconnect between each other to allow the tonneau cover to fold and/or roll onto itself. For example, the panels may be pivotally engaged to one another to form a continuous tonneau cover so that, upon retraction of the tonneau cover, the panels pivot relative to each other to fold onto one another. The panels may interconnect to form a seam between the panels. The seams may be sealed to prevent moisture, debris, or both from entering the cargo box. The panels may extend between opposing sidewalls of the cargo box to form the tonneau cover. The panels may be free of secondary supports that structurally support a weight of the panels. For example, the panels may extend between opposing retainers and may be free of supporting crossmembers. Alternatively, or additionally, all or a portion of the panels may include one or more secondary supports.

The panels may include one or more crossmembers. The crossmembers may function to support the panels. The crossmembers may function to communicate with one or more additional components of the tonneau cover system. The crossmembers may extend between opposing sidewalls so that crossmembers, and thus the tonneau cover, may be secured to the sidewalls. The crossmembers may be structurally rigid. The crossmembers may be solid or may be hollow. For example, the crossmembers may be a solid rod or may be a hollow tube. The crossmembers may have one or more channels, one or more grooves, one or more openings, or a combination thereof. The crossmembers may include one or more holes, one or more slots, or both. The one or more holes, one or more slots, or both may receive one or more fasteners to secure secondary attachments (e.g., one or more latch assemblies, one or more actuator assemblies, or both) to the crossmembers. The one or more holes and one or more slots may be any desired size and/or shape. The panels may be secured to the crossmembers by one or more fasteners. The fasteners may extend partially or completely through the crossmembers. The fasteners may be secured via one or more nuts, washers, or both. The fasteners may be threaded or may be free of threading. For example, the fastener may be a nail, screw, bolt, pin, hook, latch, or a combination thereof.

The crossmembers may include one or more flanges. The flanges may function to at least partially support one or more components secured within the crossmembers, such as one or more latch assemblies, one or more actuator assemblies, or both. The flanges may create a channel along a longitudinal axis of the crossmembers such that a latch assembly, actuator assembly, or both can freely slide from a proximal end to a distal end of the crossmember while still engaging the crossmember. The flanges may create a channel with an opening sufficiently wide to allow a case of a latch assembly, a base of an actuator assembly, or both to be inserted and rotated to engage the crossmember. The flanges may be opposing inwardly turned flanges that create an opening into the crossmember. The flanges may be symmetrically opposing surfaces or may be dissimilar. The flanges may project from one or more sides of the crossmember at a substantially right angle. The inwardly turned flanges may project from one or more sides of the crossmember at an angle other than a substantially right angle. The flanges may have a thickness equal to a wall thickness of the crossmember. The flanges may have a thickness greater than or less than a wall thickness of the crossmember. For example, the flanges may have a thickness of about 10 mm thick while the crossmember may have a wall thickness of about 5 mm thick. The flanges may have substantially smooth surfaces to allow a latch assembly, actuator assembly, or both to freely move along a longitudinal axis of a channel of the crossmember. The smooth surfaces may include a lubricant to decrease friction between the latch assembly, actuator assembly, or both and the smooth surfaces. The lubricant may be grease, oil, silicone, any other friction decreasing material, or a combination thereof. The flanges may have a surface finish to decrease friction between the latch assembly, actuator assembly, or both and the flanges. For example, the flanges (or a substantial portion of the crossmember) may be zinc-plated and/or electrostatically coated to provide a surface free of contour and/or burrs. The flanges may allow insertion, removal, or both of a latch assembly, actuator assembly, or both without disassembling the tonneau cover system.

One or more latch assemblies may be secured to one or more panels of the tonneau cover. The latch assemblies may function to releasably secure the tonneau cover to the cargo box of a vehicle. The latch assemblies may secure the tonneau cover directly or indirectly to the cargo box. For example, the latch assemblies may connect directly to one or more sidewalls of a cargo box. Alternatively, the latch assemblies may latch to one or more brackets mounted to sidewalls of the cargo box. The latch assemblies may maintain a position of the tonneau cover during operation of a vehicle so that the tonneau cover remains secured to the cargo box. The latch assemblies may be fixedly secured to the panels of the tonneau cover system. The latch assemblies may be secured directly to the panels or may be secured within crossmembers of the panels. The latch assemblies may be positioned near terminal ends of the crossmembers to engage sidewalls of the cargo box, brackets mounted to sidewalls of the cargo box, or both. The latch assemblies may be fully enclosed within the crossmembers or may at least partially protrude from the crossmembers. The latch assemblies may be secured to the crossmember using one or more fasteners. For example, the one or more fasteners may extend through holes, slots, or both of the crossmember into holes, slots, or both of the latch assemblies. Alternatively, the latch assemblies may include a set screw that engages an inner channel of the crossmember to maintain a position of the latch assemblies so that the crossmember may be free of slots, holes, or both. The latch assemblies may be configured to automatically latch to a sidewall and/or bracket upon engagement between the latch assemblies and the sidewall and/or bracket. The latch assemblies may be actuated to release the latch assemblies from the sidewall and/or bracket to remove all or a portion of the tonneau cover from the cargo box. All or a portion of the panels may include one or more latch assemblies. All or a portion of the panels may include latch assemblies near opposing terminal ends to secure the panels to opposing sidewalls, opposing brackets, or both. Alternatively, or additionally, the panels may be free of latch assemblies.

The latch assemblies may include a case. The case may function to enclose an actuated portion of the latch assembly. The case may form a portion of the latch assembly that communicates with an engaging portion of a sidewall, bracket, or both to at least partially support the tonneau cover when secured to the cargo box. The case may be positioned within a crossmember. The case may be any desired size and/or shape. The case may have a width greater than a width between opposing flanges of the crossmember so that the case is supported by the crossmembers. The case may include one or more segments. For example, the case may include opposing segments that are secured to one another by a plurality of fasteners. The fasteners may extend through one or more holes of a first case segment and be received by one or more associated holes of a second case segment. The fasteners may be threaded into the holes of each case segment to secure the segments to one another. Alternatively, the case segments may be secured free of secondary fasteners. For example, the case segments may be secured using one or more adhesives, a press-fit condition, or both.

The case may be structurally rigid. The case may be molded, cast, stamped, extruded, pultruded, or a combination thereof. The case may include one or more exterior shells. For example, the case may include a soft and/or flexible outer shell that may abut a panel, a crossmember, or both so that the case does not damage the panel, crossmember, or both during movement. The case may include one or more contoured portions, one or more linear segments, one or more arcuate portions, or a combination thereof. The case may include one or more chamfered edges, one or more steps, one or more flanges, one or more projections, or a combination thereof. The case may include a channel, cutout, notch, valley, finger, mouth, or a combination thereof. The case may include one or more bearings that communicate with the crossmembers of the panels to allow for movement of the case within the crossmembers. Alternatively, the case may be free of any bearings yet still freely move within the crossmember until fixedly secured to the crossmember in any desired position.

The case may include a receiving portion. The receiving portion may function to receive an engaging portion of a sidewall, a bracket, or both. The receiving portion may at least partially enclose the engaging portion. The engaging portion may be at least partially positioned within the receiving portion when the latch assembly is latched (i.e., secured) to the sidewall, the bracket, or both. The receiving portion may be shaped to mate with the engaging portion. For example, the engaging portion may be substantially cylindrical, and the receiving portion may have a U-shaped channel to receive the engaging portion. However, it is contemplated that the receiving portion may be any size and/or shape to receive the engaging portion. For example, the receiving portion may be U-shaped, V-shaped, D-shaped, G-shaped, O-shaped, or a combination thereof. The receiving portion may be a channel, cutout, notch, divot, valley, mouth, or a combination thereof. The receiving portion may include one or more hinge points. For example, the receiving portion may include one or more arms that remain in a closed position until in communication with the engaging portion. Once the engaging portion contacts the one or more arms, the one or more arms pivot about their hinge points to open and receive the engaging portion. The receiving portion may be monolithically (i.e., integrally) formed with the case. The receiving portion may be positioned anywhere along the case. The receiving portion may be at least partially recessed from an exterior surface of the crossmembers. The receiving portion may at least partially project away from the exterior surface of the crossmembers to contact the engaging portion. The receiving portion may be in contact with the engaging portion or may be free of contact with the receiving. For example, the engaging portion may be at least partially positioned within the receiving portion yet be free of contact with a surface of the receiving portion.

The latch assembly may include a retainer. The retainer may function to at least partially support the tonneau cover when secured to the engaging portion. The retainer may function to abut the engaging portion when the latch assembly is latched to the engaging portion. The retainer may be at least partially positioned within the case of the latch assembly. The retainer may be structurally rigid to support a weight of the tonneau cover. For example, the retainer may be a metal plate positioned within a plastic receiving portion of the case to directly contact the engaging portion. The retainer may be secured to one or more segments of the case. The retainer may include one or more holes to receive one or more fasteners extending through the case. The holes may be any size and/or shape and may be aligned with holes of the case to secure the retainer to the case. The retainer may include a portion shaped substantially similar to the receiving portion of the case. However, the retainer may be any size and/or shape to support the tonneau cover, contact the engaging portion, or both. The retainer may include one or more cutouts, one or more channels, one or more slots, or a combination thereof. The retainer may be substantially enclosed within the case.

The retainer may include a projection. The projection may function to position a biasing member of the latch assembly. The projection may be positioned anywhere along the retainer. The projection may be located near one or more peripheral edges of the retainer. The projection may be positioned away from the peripheral edges of the retainer. For example, the projection may be positioned within a cutout near a central portion of the retainer. The projection may connect to a biasing member. The projection may be a tooth, finger, clasp, latch, or a combination thereof. The projection may be monolithically formed with the retainer.

The retainer may be in communication with a latch bolt. The latch bolt may function to latch the latch assembly to an engaging portion of a sidewall, a bracket, or both. The latch bolt may function to enclose the receiving portion of the case. The latch bolt may move within the latch assembly to allow for latching yet prevent unwanted release of the latch assembly from the engaging portion. For example, the latch bolt may move freely to allow the engaging portion to enter the receiving portion of the latch assembly but prevent the engaging portion from being removed from the receiving portion unless the latch assembly is intentionally actuated. The latch bolt may move within the case. The latch bolt may pivot relative to the case to allow for latching. Alternatively, the latch bolt may slide along a portion of the latch assembly. The latch bolt may be a pin, hook, finger, rod, clasp, or a combination thereof. The latch bolt may include one or more tapered edges, one or more contoured edges, or both. The tapered edges, contoured edges, or both may promote movement of the latch bolt when the latch assembly contacts the engaging portion. The taper, contour, or both may be free of contact with the engaging portion once the engaging portion is positioned within the receiving portion. The latch bolt may be structurally rigid to prevent the engaging portion from being inadvertently removed from the receiving portion.

The latch bolt may include a slit. The slit may function to direct movement of the latch bolt during articulation of the latch assembly. The slit may guide the latch bolt during a latching operation, a releasing operation (i.e., when the latch assembly releases the engaging portion), or both. The slit may be positioned along an exterior surface of the latch bolt. The slit may be any size and/or shape. The slit may form a channel. The slit may be shaped to movably secure the latch bolt to the retainer. For example, the slit may contact one or more walls of the retainer so that the latch bolt slides along the retainer. The slit may include opposing walls that engage opposing surfaces of the retainer. The latch bolt may include a plurality of slits or a single slit. The slit may be shaped to prevent lateral movement of the latch bolt relative to a longitudinal axis of the latch assembly. The slit may allow movement of the latch bolt in any desired direction relative to the retainer, the case, or both.

The latch bolt may be in communication with a biasing member of the latch assembly. The biasing member may function to bias the latch bolt in a position to secure an engaging portion in the receiving portion of the latch assembly. The biasing member may bias the latch bolt so that the latch bolt at least partially encloses the receiving portion. The biasing member may be positioned within the case. The biasing member may be positioned on the projection of the retainer. The biasing member may allow for articulation of the latch bolt away from the receiving portion. For example, the biasing member may be compressed when a force is applied to the latch bolt to articulate the latch bolt away from the receiving portion yet bias the latch bolt toward the receiving portion after the force is released. The biasing member may be a spring, coil, band, foam, other type of elastic mechanism, or a combination thereof. The biasing member may abut a portion of the latch bolt. For example, the biasing member may abut an end of the latch bolt that opposes an end positioned within or near the receiving portion. The biasing member may be positioned entirely within the case of the latch assembly. The biasing member may allow for movement of the latch bolt based on a groove of the latch bolt.

The groove may function to connect the latch bolt to a cable. The groove may be positioned anywhere along the latch bolt. The groove may be any desired size and/or shape. The groove may include one or more flanges, one or more walls, or both. The groove may include a lip. The groove may include one or more mechanical fasteners. The grove may be recessed from an exterior surface of the latch bolt. The groove may be shaped substantially similar to a portion of a cable.

The cable may function connect the latch bolt to an actuator assembly. The cable may connect the latch assembly to an actuator assembly. The cable may create a tension force on the latch bolt during actuation of the latch assembly. The cable may be sufficiently rigid to create the tension force. For example, the cable may have a low modulus of elasticity to prevent stretching of the cable during operation. However, it is contemplated that the cable may be flexible enough for movement of the cable. The cable may be any desired gage. The cable may be a rope, cord, line, wire, chain, or a combination thereof. The cable may be formed of one or more wound fibers. The cable may be metallic or nonmetallic. The cable may include a protective casing (i.e., a sheath). The cable may be substantially positioned within a crossmember. The tonneau cover system may have a single cable or may include a plurality of cables. For example, each panel may include a pair of opposing latch assembly connected to a common actuator assembly. Each latch assembly may be connected to the actuator assembly by a separate cable. However, each cable may be any desired length based on the positioning of the latch assemblies, the actuator assembly, or both. The cables may be sufficiently taught when connected between the actuator assembly and the latch assemblies to promote tension on the latch bolts.

The cable may include a head. The head may function to secure the cable to the latch bolt. The head may be secured within a groove of the latch bolt. The head may be positioned near a terminal end of the cable. The head may be monolithically formed with the cable. The head may have a relative width greater than a gage of the cable. The head may be shaped substantially similar to a groove of the latch bolt so that the head may mate with an inner surface of the groove. The head may prevent disconnection of the cable from the latch bolt. The head may translate a tension of the cable to the latch bolt so that the latch bolt is articulated. The head may be positioned within the case of the latch assembly, yet the cable may extend through a case hole of the case.

The case hole may function to receive the cable. The case hole may be any size and/or shape to receive the cable. The case hole may be positioned along an exterior surface of the case. The case hole may extend through a thickness of the case. The case hole may include a channel to receive the cable. The case hole may be tapered. The case hole may be positioned near an end of the case that opposes the receiving portion. The case hole may be positioned along a longitudinal axis of the case or may be offset from the longitudinal axis.

The cable may connect the latch assembly to an actuator assembly. The actuator assembly may function to actuate one or more latch assemblies. Actuation of the actuator assembly may move a latch bolt of one or more latch assemblies so that the latch assemblies may be disconnected from an engaging portion of a sidewall, a bracket, or both. The actuator assembly may be mounted to one or more panels, one or more crossmembers of one or more panels, or both. It is contemplated that the actuator assembly may actuate a plurality of latch assemblies substantially simultaneously to allow for quicker release of the tonneau cover from the cargo box. As such, a user of the tonneau cover system may release one or more panels from the cargo box without being required to individually release each latch assembly, without walking back and forth between opposing sides of the vehicle, or both. The actuator assembly may include one or more stationary components, one or more movable components, or both. For example, a first portion of the actuator assembly may be fixedly secured to the panel, crossmember, or both while a second component rotates relative to the first portion. The actuator assembly may be manually operated or may include one or more automated portions. For example, the actuator assembly may include a motorized actuator that may be actuated based on interaction from a user. Each panel of the tonneau cover may include an actuator assembly or only a portion of the panels may include an actuator assembly. The actuator assembly may actuate all of the latch assemblies of a desired panel or may actuate only a portion of the latch assemblies of a panel. The actuator assembly may be positioned anywhere along the crossmember, the panel, or both. For example, the actuator may be positioned between opposing latch assemblies secured in a crossmember of a panel so that cables connect the latch assemblies to opposing ends of the actuator assembly. The actuator assembly may be positioned substantially near a midpoint between a pair of latch assemblies. Alternatively, the actuator assembly may be biased towards one of the latch assemblies so that the actuator assembly may be accessed from one side of the tonneau cover yet actuate both latch assemblies. The actuator assembly may be secured to a crossmember using one or more fasteners. For example, the one or more fasteners may extend through holes, slots, or both of the crossmember into holes, slots, or both of the actuator assembly. Alternatively, the actuator assembly may include a set screw that engages an inner channel of the crossmember to maintain a position of the actuator assembly so that the crossmember may be free of slots, holes, or both.

The actuator assembly may include a base. The base may function to movably secure one or more arms of the actuator assembly. The base may function to secure the actuator assembly to a panel of the tonneau cover, a crossmember, or both. The base may be positioned within a crossmember. The base may be any desired size and/or shape. The base may have a width greater than a width between opposing flanges of the crossmember so that the base is supported by the crossmembers. The base may include one or more projections that project from one or more surfaces of the base. The base may include one or more holes. The one or more holes may be any desired size and/or shape. The base may include one or more linear segments, one or more arcuate portions, one or more contoured portions, or a combination thereof. The base may include one or more channels, one or more notches, one or more cutouts, one or more steps, or a combination thereof. The base may be structurally rigid. The base may be molded, cast, stamped, extruded, pultruded, or a combination thereof. The base may include one or more exterior shells. For example, the base may include a soft and/or flexible outer shell that may abut a panel, a crossmember, or both so that the base does not damage the panel, crossmember, or both during movement. The base may include one or more bearings that communicate with the crossmembers of the panels to allow for movement of the base within the crossmembers. Alternatively, the base may be free of any bearings yet still freely move within the crossmember until fixedly secured to the crossmember in any desired position.

The base may include one or more channels. The channels may function to guide one or more arms of the actuator assembly. The channels may be positioned along one or more projections of the base. For example, a plurality of projections may extend substantially orthogonally relative to a surface of the base and a channel may be positioned near a terminal end of each projection. The channels may include one or more central portions surrounded by opposing walls. A portion of the one or more arms may be positioned within the channel so that the opposing walls guide the one or more arms. The channels may include a slot. The channels may be any desired size and/or shape. The channels may be U-shaped, D-shaped, V-shaped, L-shaped, G-shaped, or a combination thereof. The channels may be flexible or may be structurally rigid. The channels may include one or more lips, one or more flanges, or both. The channels may include a lubricant to promote movement of the one or more arms within the channels. The channels may be secured to the one or more arms by a fastener, adhesive, or both. The channels may be secured to the one or more arms free of secondary fasteners, adhesives, or both.

The one or more arms may communicate with the channels. The arms may function to translate actuation of the actuator assembly into articulation of the latch assemblies. The arms may connect to one or more cables connected to the latch assemblies. The arms may be secured to the base by the channels. The arms may move in any desired direction based on actuation of the actuator assembly. The arms may be substantially linear segments. The arms may include one or more arcuate portions. The arms may be substantially planar, may include one or more contour portions, or both. The arms may be structurally rigid. A movement of the arms may move the cables connected to the arms, thereby creating a tension on the latch bolts of the latch assemblies. As a result of the movement of the arms, the latch bolts may be moved to release the latch assemblies from one or more engaging portions. The arms may travel any desired distance during actuation. The arms may travel in a substantially linear direction, a nonlinear direction, or both. The arms may travel until the arms abut one or more portions of the actuator assembly.

The arms may include an arm slot. The arm slot may function to communicate with one or more channels of the base to guide the arms. The arm slot may be positioned anywhere along the arms. The arm slot may be any desired size and/or shape. The arm slot may be a cutout portion of the arm. The arm slot may be at least partially positioned within one or more channels of the base. The arm slot may be positioned along an interior portion of the arm, may be near one or more peripheral edges of the arm, or both. The arm slot may be substantially linear, may include one or more nonlinear segments, or both. The arm slot may extend along a length of the arm. A length of the arm slot may dictate a travel distance of the arm during articulation. One or more walls of one or more channels may be inserted into the arm slot. The arm slot may have one or more rounded edges. The arm slot may have one or more lubricants to promote movement of the arm slot relative to one or more channels.

A plurality of arms may be in communication with one another, the base, or both via a connecting portion. The connecting portion may function to connect the plurality of arms to each other. The connecting portion may function to articulate the one or more arms. The connecting portion may translate a rotational actuation of the actuator assembly into linear movement of the one or more arms. The connecting portion may be pivotally engaged to the one or more arms. The connecting portion may be pivotally engaged to the arms using one or more fasteners. The fasteners may be a pin, screw, bolt, hook, rivet, rod, or a combination thereof. The arms may be secured near terminal ends of the connecting portion so that a central portion of the connecting portion is substantially free of any encumbrances. The connecting portion may be shaped substantially similar to one or more arms or may have a different shape.

The connecting portion may include a keyhole. The keyhole may function to receive a key of a rotational member. The keyhole may movably connect the connecting portion to the rotational member. The keyhole may have a shape to substantially match a shape of the key of the rotational member. The keyhole may be positioned anywhere along the connecting portion. However, it is contemplated that the keyhole may be positioned substantially near a longitudinal midpoint of the connecting portion so that one or more arms may be connected to terminal ends of the connecting portion. The keyhole may be shaped so that a rotational movement of the rotational member is translated into rotation of the connecting portion about an axis of rotation of the key.

The rotational member may function to actuate the actuator assembly. The rotational member may be rotated to actuate the actuator assembly. Actuation may result in the one or more arms connected to the cables moving, thereby articulating the latch assemblies to release the tonneau cover from the engaging portions. The actuator assembly may include a single rotational member that actuates the actuator assembly and articulates a plurality of latch assemblies substantially simultaneously. Alternatively, the actuator assembly may include a plurality of rotational members for each connected latch assembly so that the latch assemblies may be articulated independently from one another. The rotational member may actuate the actuator assembly based on a rotational movement. The rotational movement may be done manually by one or more users physically rotating the rotational member. However, the rotational member may also be rotated automatically (i.e., not manually) via one or more electric motors. The rotational member may include a knob, gripping portion, handle, or a combination thereof for a user to grip and rotate the rotational member. The rotational member may include one or more movable portions, one or more stationary portions, or both. For example, a stationary portion of the rotational member may be fixedly secured to the base while a movable portion is movably connected to the connecting portion to move the one or more arms. The rotational member may at least partially protrude from the crossmember. For example, a rotating portion of the rotational member may protrude from the crossmember so that a user may rotate the rotating portion.

The rotational member may include a locking portion. The locking portion may function to lock the rotational member to the base. The locking portion may secure the rotational member to the base so that at least a portion of the rotational member is free to rotate. The locking portion may remain stationary while the rotational member is rotated. The locking portion may engage a hole of the base. The locking portion may at least partially extend through the hole of the base. An outer circumference of the locking portion may be shaped substantially complimentary to the hole of the base so that the locking portion is prevented from rotation when secured to the base. The locking portion may be a stem of the rotational member. The locking portion may project from a base of the rotational member. The locking portion may have any desired size and/or shape. The locking portion may be structurally rigid or may be compressible. The locking portion may be threaded so that a fastener may be threaded onto the threading of the locking portion. For example, the locking portion may extend through the hole of the base so that the rotational member at least partially abuts a first surface of the base while a nut is threaded onto the locking portion until the nut abuts an opposing second surface of the base and fixedly secures the locking portion in place.

The locking portion may be at least partially surrounded by a seal. The seal may function to prevent moisture, debris, or both from entering the base. The seal may ensure a tight fit between the locking portion and the base so that the locking portion is prevented from any unwanted movement (e.g., wiggling) during operation. The seal may be compressible, flexible, or both. The seal may be rigid. The seal may be an O-ring, sealant material, or both.

The locking portion of the rotational member may remain substantially stationary while a key of the rotational member is free to rotate. The key may function to connect the rotational member to the connecting portion. The key may translate a rotation of the rotational member into a rotation of the connecting portion. The key may be inserted into a keyhole of the connecting portion. The key may be shaped substantially similar to the keyhole. The key may be positioned near a terminal end of the rotational member. The key may be any desired size and/or shape. The key may include one or more holes. The holes may receive one or more fasteners that secure the connecting portion to the key.

The actuator assembly may also include one or more clamps. The clamps may function to connect one or more cables to the actuator assembly. The clamps may be positioned anywhere along the actuator assembly. It is contemplated that the clamps may be positioned on the one or more arms so that the clamps move based on movement of the arms. The clamps may be any type of clamp to retain the cables. The clamp may be a barrel clamp, C-clamp, band clamp, screw clamp, pipe clamp, sliding clamp, or a combination thereof. The clamp may secure a cable connected to a latch assembly so that the latch assembly may be articulated based on movement of the cable to release the latch assembly from one or more brackets. The clamps may be configured to secure the one or more cables to the latch assembly, yet the cables may be disconnected from the clamps for replacement, repair, or both. Also, it is contemplated that the clamps may be positioned on the actuator assembly, the latch assembly, or both. For example, both the latch assemblies and the actuator assembly may secure the cable via one or more clamps so that the cable may be disconnected from both the latch assemblies and the actuator assembly.

The brackets may function to connect the tonneau cover to the cargo box of a vehicle. The brackets may be mounted to the cargo box. The brackets may be secured to one or more sidewalls, one or more tailgates, or both. The brackets may remain stationary and/or fixedly secured to the cargo box during opening and closing of the tonneau cover. For example, the one or more panels of the tonneau cover (including the one or more latch assemblies, one or more actuator assemblies, or both) may be folded onto one another while the brackets remain in place. The latch assemblies, actuator assemblies, or both may remain substantially in place relative to the panels during folding, storage, unfolding, or a combination thereof so that the latch assemblies may easily latch to the brackets upon unfolding and the actuator assemblies may remain operable.

The brackets may be mounted to the cargo box using one or more fasteners, one or more adhesives, or both. The brackets may be welded directly to the cargo box. The brackets may be removable for replacement, repair, or both. The brackets may include one or more holes, one or more slots, or both to receive one or more fasteners to secure the brackets to the cargo box. The holes, slots, or both may be any desired size and/or shape. The holes, slots, or both may align with holes, slots, or both in sidewalls and/or a tailgate of the cargo box to receive a fastener. Each panel of the tonneau cover may secure to a pair of brackets. The pair of brackets may be positioned on opposing ends of the panel. For example, a first bracket may be mounted to a first sidewall while a second bracket may be mounted to an opposing second sidewall so that the panel spans a distance between the brackets. Any desired number of brackets, any location of the brackets, or both may be configured to support a tonneau cover and secure the tonneau cover to the cargo box.

The brackets may include a plate. The play may function to mate with a sidewall, a tailgate, or both of a cargo box of a vehicle. The plate may have a substantially planar surface. The plate may have a complimentary surface relative to the sidewall, the tailgate, or both. The plate may include the one or more holes, one or more slots, or both to mount the bracket to the cargo box. The plate may be any desired size and/or shape. The plate may abut the sidewall, the tailgate, or both so that the plate is substantially flush with a surface of the sidewall, the tailgate, or both. The plate may be structurally rigid. The plate may be metallic, plastic, or both. The plate may be molded, stamped, cut, cast, or a combination thereof. The plate may include one or more protective coatings to prevent degradation, corrosion, rust, or a combination thereof. The protective coating may be zinc plating, electrophoretic paint, or both.

The brackets may include an engaging portion. The engaging portion may function to connect the brackets to one or more latch assemblies. The engaging portion may be received by a receiving portion of the latch assemblies so that the tonneau cover is secured to the cargo box via the brackets. The engaging portion may be any desired size and/or shape. The engaging portion may be a wire, rod, tubular member, or a combination thereof. The engaging portion may be a hook, finger, projection, arm, extension, flange, or a combination thereof. The engaging portion may be structurally rigid to at least partially support a weight of the tonneau cover. The engaging portion may extend from the bracket at any desired angle to mate with the receiving portion of the latch assemblies. The engaging portion may be monolithically formed with the bracket or may be secured to the bracket. For example, the engaging portion may be secured along one or more beads of the bracket.

The beads may function to connect the engaging portion to the bracket. The beads may function to increase structural integrity of the bracket. The beads may be positioned along the plate of the bracket. The beads may receive a portion of the engaging portion. For example, a portion of the engaging portion may be received in the beads so that the engaging portion may be welded, fastened, adhered, or a combination thereof to the beads. The bracket may have any desired number of beads. The beads may be any desired size and/or shape.

Turning now to the figures, FIG. 1 illustrates a perspective view of a vehicle 10. The vehicle 10 includes a cargo box 12 and a passenger cabin 14. The cargo box 12 includes a front wall (not shown), a pair of opposing sidewalls 16, and a tailgate 18. As illustrated, the sidewalls 16 are substantially symmetrically opposite to each other. The vehicle 12 further includes a tonneau cover system 28 disposed over the cargo box 12 and secured to the opposing sidewalls 16 via a plurality of brackets (see FIGS. 2-6). The tonneau cover system 28 includes a tonneau cover 30 having a plurality of foldable panels 32. The plurality of panels 32 may be supported by one or more crossmembers that span a distance between the opposing sidewalls 16 and secure the tonneau cover 30 to the brackets (see FIGS. 2-6). The tonneau cover 30 may be configured so that the plurality of panels 32 may folded onto each other. The plurality of panels 32 may be folded to expose all or part of the cargo box 12, cover all or part of the cargo box 12, or a combination thereof.

Figure 2:
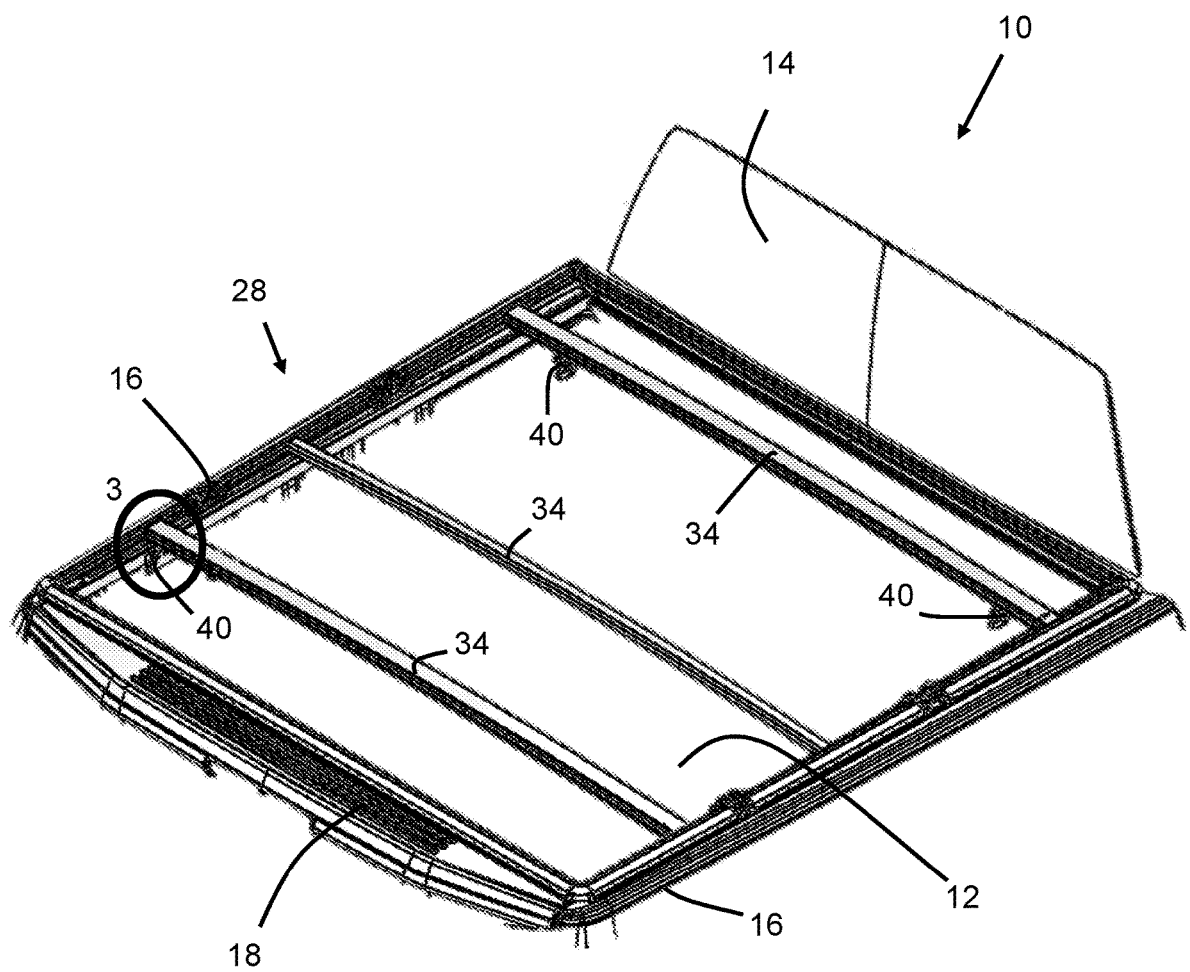
FIG. 2 is a perspective view of a tonneau cover system.

FIG. 2 illustrates a perspective view of a tonneau cover system 28 secured to a cargo box 12 of a vehicle 10. For simplicity, a tonneau cover of the tonneau cover system has been omitted (see FIG. 1). The vehicle 10 includes the cargo box 12 and a passenger cabin 14. The cargo box 12 includes a front wall (not shown), a pair of opposing sidewalls 16, and a tailgate 18. A plurality of crossmembers 34 span a distance between the opposing sidewalls 16 of the cargo box 12. The crossmembers 34 may be secured to brackets 40 mounted to the sidewalls 16. The crossmembers 34 may be configured to support the tonneau cover and releasably engage the brackets 40 so that the tonneau cover may be folded and unfolded onto itself (see FIGS. 1 and 3-6).

Figure 3:
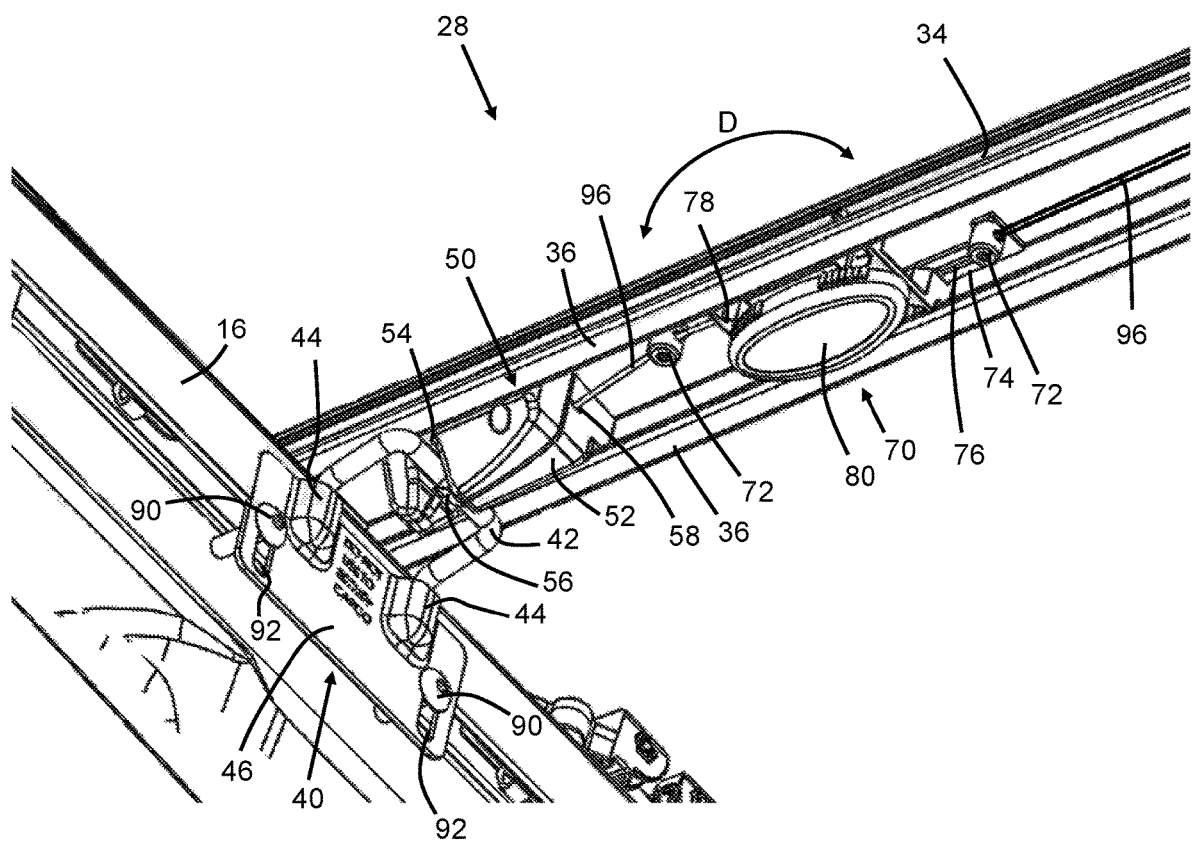
FIG. 3 is close-up perspective view 3 of FIG. 2.

FIG. 3 illustrates a close-up view 3 of the tonneau cover system 28 of FIG. 2. A crossmember 34 of the tonneau cover system 28 spans between opposing sidewalls 16 of the cargo box of a vehicle (see FIGS. 1 and 2). The crossmember 34 includes opposing flanges 36 that may form a channel to secure one or more latch assemblies 50, one or more actuator assemblies 70, or both. The latch assembly 50 may include a case 52 secured within the crossmember 34. The latch assembly 50 may further include a receiving portion 54 that receives an engaging portion 42 of a bracket 40 secured to a sidewall 16. The engaging portion 42 may be locked within the receiving portion 54 of the latch assembly 50 by a latch bolt 56. The latch bolt 56 may be directly or indirectly connected to a cable 96 extending through a case hole 58 of the case 52. The cable 96 may also be connected to a clamp 72 of the actuator assembly 70 so that the actuator assembly 70 is in communication with the latch assembly 50. The actuator assembly 50 may include a plurality of movable arms 74 secured to a base 78 of the actuator assembly 70 that may move along arm slots 76 of the arms 74. A rotational member 80 of the actuator assembly 70 may be rotated in a direction (D) so that the arms 74 may articulate to move the cable 96 secured in the clamp 72, thereby moving the latch bolt 56 of the latch assembly 50. It should be noted that while a single latch assembly 50 is shown connected to the actuator assembly 70, a plurality of latch assemblies 50 may be in communication with the actuator assembly 70 by one or more additional cables 96. For example, the actuator assembly 70 may release latch bolts 56 in latch assemblies 50 near opposing ends of the crossmember 34. Additionally, as illustrated, the bracket 40 may include a plurality of beads 44 that may secure the engaging portion 42 to a plate 46 of the bracket 40, increase structural strength of the bracket 40, or both. The bracket 40 may be secured to the sidewall 16 by one or more fasteners 90 secured in one or more slots 92 of the bracket plate 46.

Figure 4:
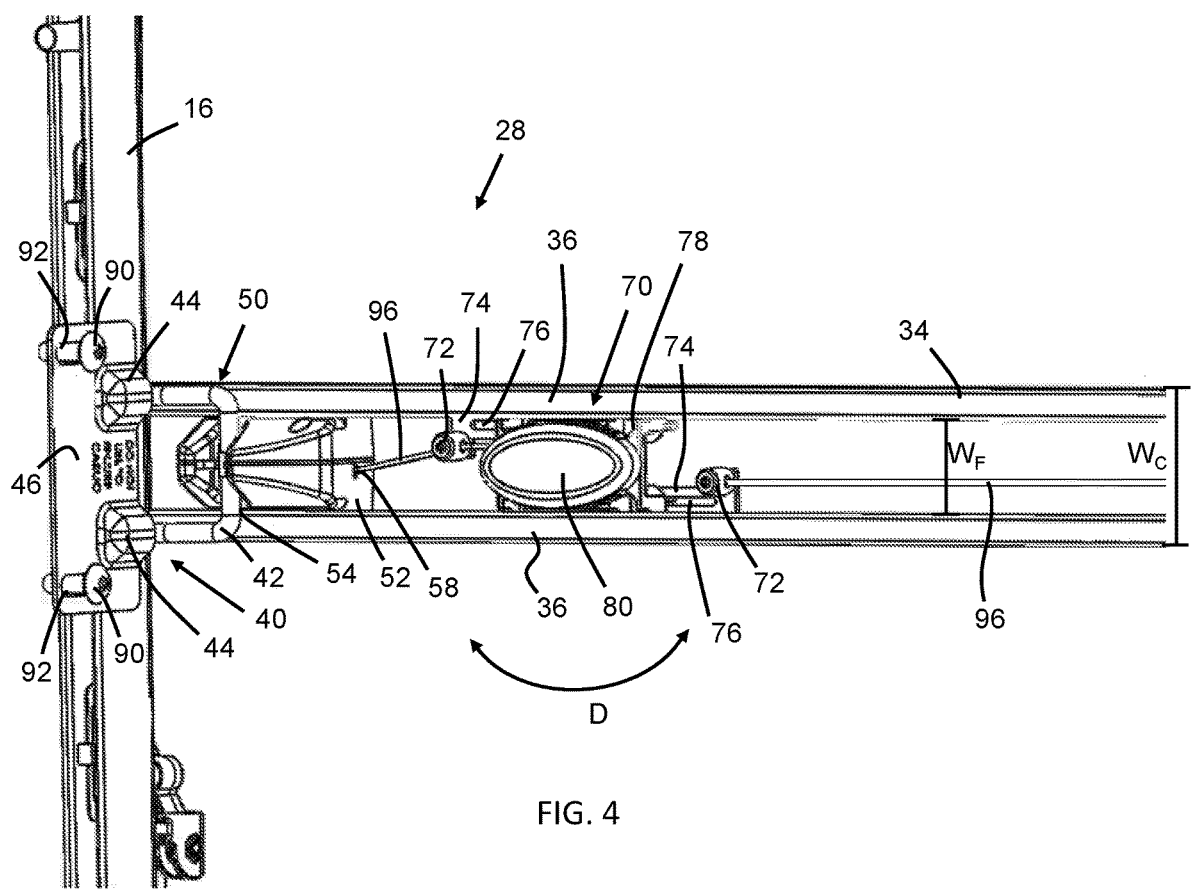
FIG. 4 is a bottom view of FIG. 3.

FIG. 4 illustrates a bottom view of the tonneau cover system 28 of FIG. 3. A crossmember 34 of the tonneau cover system 28 spans between opposing sidewalls 16 of the cargo box of a vehicle (see FIGS. 1 and 2). The crossmember 34 includes opposing flanges 36 that may form a channel to secure one or more latch assemblies 50, one or more actuator assemblies 70, or both. As shown, a width ($W_c$) of the crossmember 34 is greater than a width ($W_F$) between the opposing flanges 36 so that the one or more latch assemblies 50, one or more actuator assemblies 70, or both may be guided along the opposing flanges 36, at least partially secured by the opposing flanges 36, or both. The latch assembly 50 may include a case 52 secured within the crossmember 34. The latch assembly 50 may further include a receiving portion 54 that receives an engaging portion 42 of a bracket 40 secured to a sidewall 16. The engaging portion 42 may be locked within the receiving portion 54 of the latch assembly 50 by a latch bolt (see FIG. 3). The latch bolt may be directly or indirectly connected to a cable 96 extending through a case hole 58 of the case 52. The cable 96 may also be connected to a clamp 72 of the actuator assembly 70 so that the actuator assembly 70 is in communication with the latch assembly 50. The actuator assembly 50 may include a plurality of movable arms 74 secured to a base 78 of the actuator assembly 70 that may move along arm slots 76 of the arms 74. A rotational member 80 of the actuator assembly 70 may be rotated in a direction (D) so that the arms 74 may articulate to move the cable 96 secured in the clamp 72, thereby moving the latch bolt of the latch assembly 50. It should be noted that while a single latch assembly 50 is shown connected to the actuator assembly 70, a plurality of latch assemblies 50 may be in communication with the actuator assembly 70 by one or more additional cables 96. For example, the actuator assembly 70 may release latch bolts in latch assemblies 50 near opposing ends of the crossmember 34. Additionally, as illustrated, the bracket 40 may include a plurality of beads 44 that may secure the engaging portion 42 to a plate 46 of the bracket 40, increase structural strength of the bracket 40, or both. The bracket 40 may also be secured to the sidewall 16 by one or more fasteners 90 secured in one or more slots 92 of the bracket plate 46.

Figure 5:
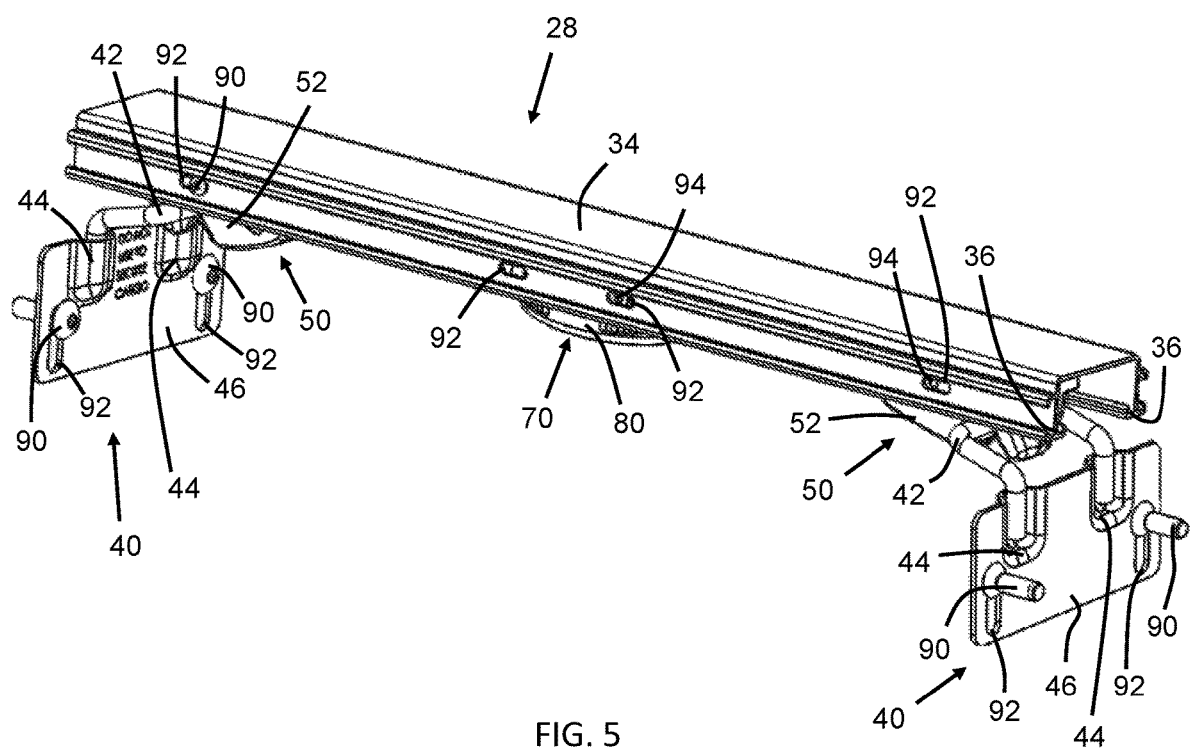
FIG. 5 is a perspective view of a crossmember of a tonneau cover system secured to opposing brackets.

FIG. 5 illustrates a perspective view of a crossmember 34 of a tonneau cover system 28. The crossmember 34 is configured to be secured to opposing brackets 40. The opposing brackets 40 may be mounted to opposing sidewalls of a cargo box of a vehicle via a plurality of fasteners 90 extending through slots 92 located on a plate 46 of each bracket 40 (see FIGS. 2-4). The crossmember 34 includes opposing flanges 36 that may form a channel to secure a pair of latch assemblies 50 and an actuator assembly 70. As illustrated, the pair of latch assemblies 50 and the actuator assembly 70 may be secured within the crossmember 34 by one or more fasteners 90 extending through slots 92 in the crossmember 34 and into holes 94 of the pair of latch assemblies 50 and the actuator assembly 70. The latch assemblies 50 may include a case 52 secured within the crossmember 34. The latch assemblies 50 may further include a receiving portion that receives an engaging portion 42 connected to a plurality of beads 44 of the bracket 40 (see FIG. 4). The latch assemblies 50 may be in communication with the actuator assembly 70 via cables extending between the latch assemblies 50 and the actuator assembly 70 (see FIG. 4). A rotational member 80 of the actuator assembly 70 may be rotated so that arms of the actuator assembly 70 may articulate to move the cables, thereby moving a latch bolt of each latch assembly 50 to release the latch assemblies 50 from the engaging portions 42.

Figure 6:
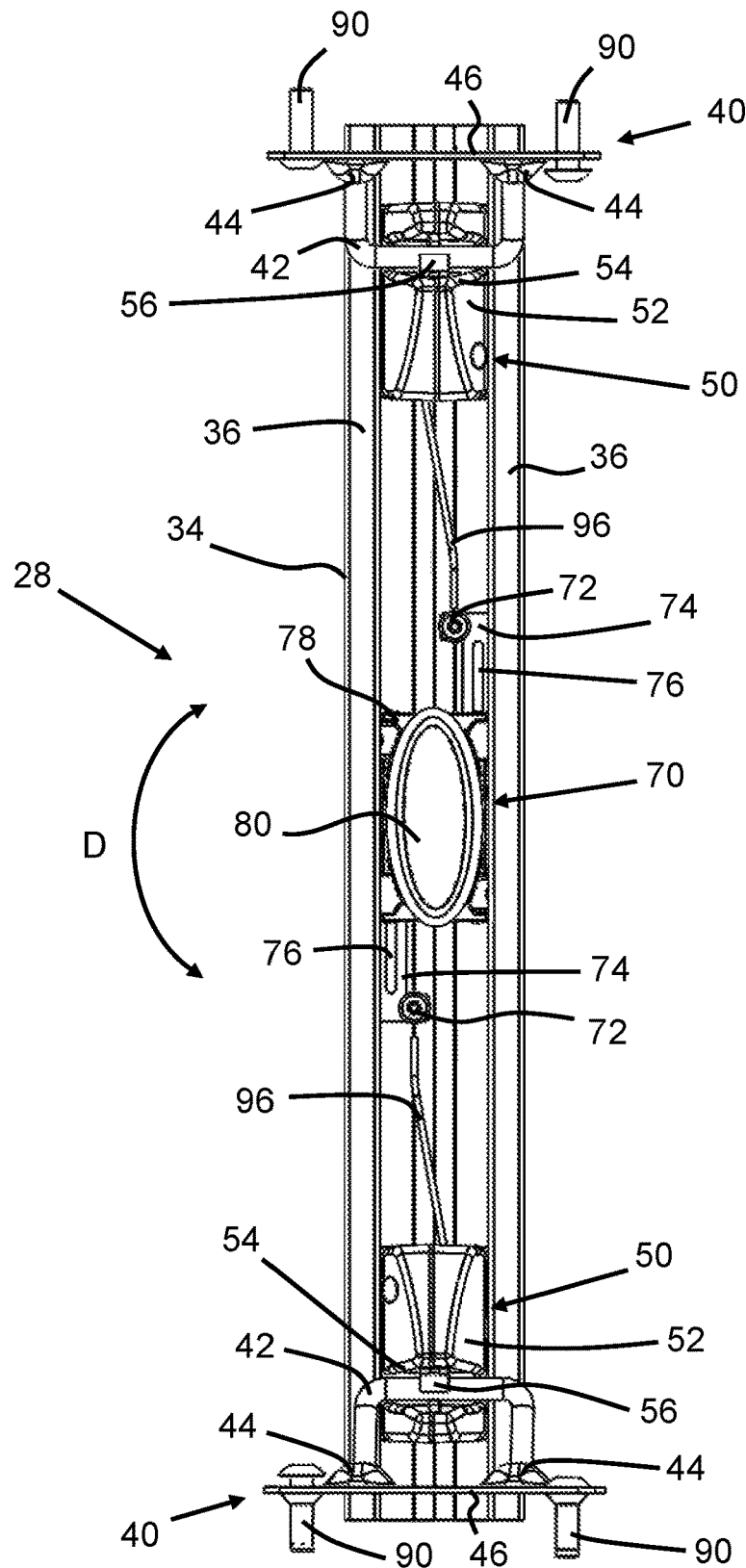
FIG. 6 is a bottom view of the crossmember of FIG. 5.

FIG. 6 illustrates a bottom view of the crossmember 34 of the tonneau cover system 28 of FIG. 5. The crossmember 34 is configured to be secured to opposing brackets 40. The opposing brackets 40 may be mounted to opposing sidewalls of a cargo box of a vehicle via a plurality of fasteners 90 extending through slots located on a plate 46 of each bracket 40 (see FIGS. 2-4). The crossmember 34 includes opposing flanges 36 that may form a channel to secure a pair of latch assemblies 50 and an actuator assembly 70. The latch assemblies 50 may include a case 52 secured within the crossmember 34. The latch assemblies 50 may further include a receiving portion 54 that receives an engaging portion 42 of the bracket 40 connected to a plurality of beads 44 of the bracket 40. The engaging portions 42 may be locked within the receiving portions 54 of the latch assemblies 50 by latch bolts 56. The latch bolts 56 may be directly or indirectly connected to cables 96 extending into the cases 52 of the latch assemblies 50. The cables 96 may also be connected to clamps 72 of the actuator assembly 70 so that the actuator assembly 70 is in communication with the latch assemblies 50. The actuator assembly 50 may include a plurality of movable arms 74 secured to a base 78 of the actuator assembly 70 that may move along arm slots 76 of the arms 74. A rotational member 80 of the actuator assembly 70 may be rotated in a direction (D) so that the arms 74 may articulate to move the cables 96 secured in the clamps 72, thereby moving the latch bolts 56 of the latch assemblies 50.

Figure 7A:
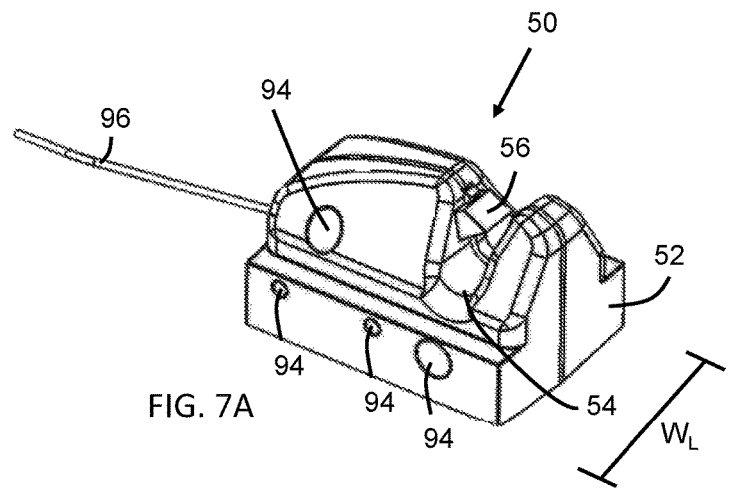
FIG. 7A is a perspective view of a latch assembly of a tonneau cover system.

FIG. 7A illustrates a perspective view of a latch assembly 50 of a tonneau cover system. The latch assembly 50 includes a case 52. A cable 96 of the tonneau cover system extends into the case 52 and is in communication with a latch bolt of an actuator assembly so that the latch bolt may be articulated to release an engaging portion of a bracket from a receiving portion 54 of the latch assembly 50 (see FIGS. 2-6). The case 52 further includes a plurality of holes 94 to receive one or more fasteners and secure segments of the case 52 to each other. Additionally, the holes 94 may be configured to secure the latch assembly 50 within a channel of a crossmember by extending one or more fasteners through the crossmember into the holes 94 of the latch assembly 50 (see FIG. 5). It should be noted that a width (WO of the latch assembly 50 may be greater than a width between opposing flanges of a crossmember so that the latch assembly 50 may be secured within the crossmember and at least partially supported by the opposing flanges (see FIG. 4).

Figure 7B:
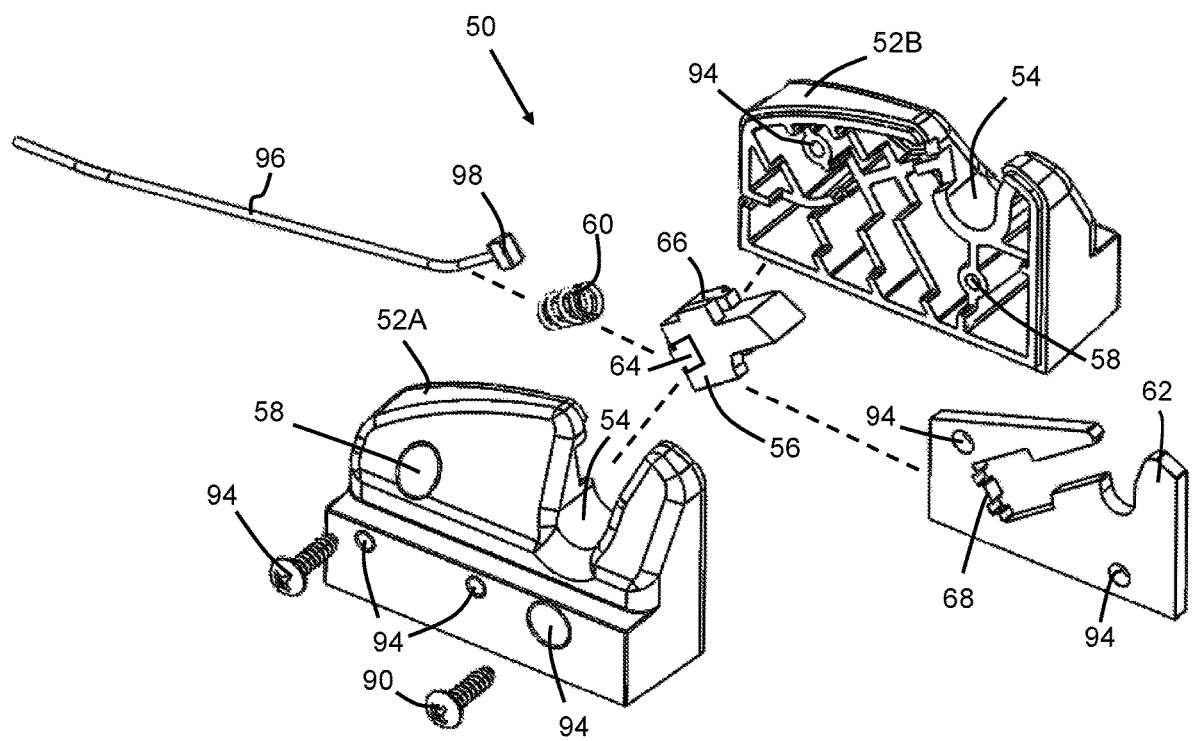
FIG. 7B is an exploded view of the latch assembly of FIG. 7A.

FIG. 7B illustrates an exploded view of the latch assembly 50 of FIG. 7A. The latch assembly 50 includes a first case segment 52A and a second case segment 52B. The case 52 of the latch assembly 50 may be formed by securing the first case segment 52A and the second case segment 52B to each other by a plurality of fasteners 90 extending through holes 94 of the first case segment 52A and into holes 94 of the second case segment 52B. A retainer 62 may be positioned within the case 52 and secured to the case 52 via the fasteners 90 extending through holes 94 of the retainer 62. The retainer 62 may be configured to receive an engaging portion of a bracket (see FIGS. 2-6). A latch bolt 56 may be slidably positioned along the retainer 62 so that a slit 66 of the latch bolt 56 is guided along the retainer 62. A head 98 of a cable 96 may be secured within a groove 64 of the latch bolt 56. The latch bolt 56 may be secured in a locked position to enclose the engaging portion of the bracket within a receiving portion 54 of the case 52 based on a biasing member 60 connected to a projection 68 of the retainer 62. The cable 96 may be configured to release the engaging portion from the receiving portion 54 by moving the latch bolt 56 away from the receiving portion 54 and into the case 52 so that the engaging portion is free to move out of the receiving portion 54. It should be noted that the cable 96 may move the latch bolt 56 based on actuation of an actuator assembly (see FIGS. 2-6). As the latch bolt 56 moves into the case 56, the biasing member 60 is compressed so that, upon release of tension of the cable 96, the biasing member 60 moves the latch bolt 56 back to an original latched position located within the receiving portion 54 of the case 52.

FIGS. 8A and 8B illustrate a perspective view and an exploded view, respectively, of an actuator assembly 70 of a tonneau cover system. The actuator assembly 70 includes a base 78. The base 78 includes a plurality of channels 82 configured to guide a pair of arms 74 along a slot 76 of each arm 74. The arms 74 are connected by a connecting portion 84 that is secured to the arms 74 by a plurality of fasteners 90. A rotational member 80 may extend through a hole 94 of the base 76 and secured to the base 76 by a nut 100. As shown, a seal 102 may be positioned around the hole 94 of the base 78 to seal a gap between the base 78 and a locking portion 86 of the rotational member 80. A key 88 of the rotational member 80 may be positioned within a keyhole 104 of the connecting portion 84 so that, as the rotational member 80 rotates, the connecting portion 84 is articulated to move the arms 74. The key 88 may be secured within the keyhole 104 by a fastener 90 extending into a hole 94 of the key 88. One or more cables may be secured in clamps 72 attached to the arms 74 so that, as the arms are articulated, a tension is applied to the cables to release one or more latch assemblies (see FIGS. 2-6). It should be noted that a width ($W_A$) of the actuator assembly 50 may be greater than a width between opposing flanges of a crossmember so that the actuator assembly 50 may be secured within the crossmember and at least partially supported by the opposing flanges (see FIG. 4).

ELEMENT LIST

10 Vehicle
12 Cargo Box
14 Passenger Cabin
16 Sidewall
18 Tailgate
28 Tonneau Cover System
30 Tonneau Cover
32 Panel
34 Crossmember
36 Flange
40 Bracket
42 Engaging Portion
44 Bead
46 Plate
50 Latch Assembly
52 Case
52A First Case Segment
52B Second Case Segment
54 Receiving Portion
56 Latch Bolt
58 Case Hole
60 Biasing Member
62 Retainer
64 Groove
66 Slit
68 Projection
70 Actuator Assembly
72 Clamp
74 Arm
76 Arm Slot
78 Base
80 Rotational Member
82 Channel
84 Connecting Portion
86 Locking Portion
88 Key
90 Fastener
92 Slot
94 Hole
96 Cable
98 Head
100 Nut
102 Seal
104 Keyhole
D Direction of Movement of the Rotational Member The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A tonneau cover system, comprising:
   (a) one or more brackets secured to at least one of a pair of opposing sidewalls of a cargo box of a vehicle;
   (b) a foldable tonneau cover having a plurality of interconnected panels, at least one of the plurality of interconnected panels including:
      (1) one or more latch assemblies that engage the one or more brackets; and
      (2) an actuator assembly connected to each of the one or more latch assemblies by a cable, the actuator assembly comprising:
         (a) a base;
         (b) one or more arms that each include a shot, wherein the one or more arms are movably connected to the base and guided along the slots by the base; and
         (c) a rotational member that articulates the one or more arms when rotated;
      wherein actuation of the actuator assembly moves the cables that in turn release engagement of the one or more latch assemblies from the one or more brackets.

2. The tonneau cover system of claim 1, wherein the one or more latch assemblies, the actuator assembly, or both are secured within a crossmember of the panel.

3. The tonneau cover system of claim 2, wherein the crossmember of the panel includes a pair of opposing inwardly turned flanges, and the one or more latch assemblies, the actuator assembly, or both, are supported by the flanges.

4. The tonneau cover system of claim 1, wherein each panel is releasably secured to a pair of opposing brackets mounted to the pair of opposing sidewalls.

5. The tonneau cover system of claim 1, wherein each of the one or more latch assemblies includes:
   (a) a case having a receiving portion that receives an engaging portion of the one or more brackets;
   (b) a retainer positioned at least partially within the case and configured to support the engaging portion; and
   (c) a latch bolt slidably secured to the retainer and configured to at least partially enclose the receiving portion of the case to lock the engaging portion within the receiving portion, wherein the cable is connected to the latch bolt so that movement of the cable slides the latch bolt into the case to open the receiving portion and release the engaging portion.

6. The tonneau cover system of claim 5, wherein the latch bolt is in communication with a biasing member secured within the case and the latch bolt compresses the biasing member when moved by the cable so that, after tension of the cable is released, the latch bolt is moved by the biasing member back into a position that at least partially encloses the receiving portion.

7. The tonneau cover system of claim 1, wherein each panel includes a first latch assembly positioned near a bracket on a first sidewall and a second latch assembly positioned near a bracket on a second opposing sidewall, and wherein the actuator assembly is positioned between the first latch assembly and the second latch assembly.

8. The tonneau cover system of claim 7, wherein the actuator assembly simultaneously releases engagement of the first latch assembly and the second latch assembly from their respective brackets.

9. A tonneau cover system, comprising:
   (a) a foldable tonneau cover having a plurality of interconnected panels, each of the panels including:
      (1) a crossmember having a pair of opposing flanges that form a channel;
      (2) a pair of latch assemblies secured in the channel and positioned near opposing terminal edges of the crossmember; and
      (3) an actuator assembly positioned within the channel between the pair of latch assemblies connected to each of the latch assemblies by a cable; and
   (b) a plurality of brackets secured to opposing sidewalls of a cargo box of a vehicle, a portion of each of the plurality of brackets configured to be received by a latch assembly to secure the tonneau cover to the cargo box, wherein the latch assemblies each include a latch bolt that locks a portion of the plurality of brackets to the latch assemblies;
   wherein the actuator assembly includes a first arm connected to the latch bolt of the first latch assembly by a first cable, and a second arm connected to the latch bolt of a second latch assembly by a second cable, so that, when a connecting portion extending between the first arm and the second arm is pivoted by rotating a rotational member, the first arm and the second arm are articulated; and
   wherein actuation of the actuator assembly of each panel simultaneously unlocks the pair of latch assemblies of that panel.

10. The tonneau cover system of claim 9, wherein the latch bolt is connected to the cable so that, when the actuator assembly is actuated, the cable moves the latch bolt to unlock the latch assembly.

11. The tonneau cover system of claim 9, wherein a case of each latch assembly has a width greater than a width between the opposing flanges of the crossmember so that the latch assembly is supported by the opposing flanges.

12. The tonneau cover system of claim 11, wherein a base of the actuator assembly has a width greater than the width between the opposing flanges of the crossmember so that the actuator assembly is supported by the opposing flanges.

13. The tonneau cover system of claim 9, wherein, tension is applied simultaneously to the first cable and the second cable to move the latch bolts and unlock the first latch assembly and the second latch assembly.

14. The tonneau cover system of claim 13, wherein a key of the rotational member is secured in a keyhole of the connecting portion to translate the rotation of the rotational member into pivoting the connecting portion.

15. The tonneau cover system of claim 9, where each cable includes a head that is secured within a groove of the latch bolt.

16. The tonneau cover system of claim 9, wherein the pair of latch assemblies and the actuator assembly are fixedly secured to the crossmember.

17. The tonneau cover system of claim 9, wherein an engaging portion of each of the plurality of brackets is positioned within a receiving portion of each of the latch assemblies, and the latch bolt of each latch assembly encloses the receiving portion to lock the engaging portion in the receiving portion.

18. The tonneau cover system of claim 17, wherein the latch bolt slidably moves based on actuation of the actuator assembly to unlock the latch assembly and at least partially open the receiving portion to remove the engaging portion.

* * * * *